United States Patent [19]

McGovern

[11] 4,328,428
[45] May 4, 1982

[54] WINDSPINNER FARADAY PRINCIPLE ELECTRICITY GENERATOR

[76] Inventor: James R. McGovern, 205 E. 239th St., Bronx, N.Y. 10470

[21] Appl. No.: 52,854

[22] Filed: Aug. 7, 1979

[51] Int. Cl.³ ............................................... F03D 9/00
[52] U.S. Cl. .................................... 290/55; 416/197 A
[58] Field of Search .............. 290/44, 55; 416/197 A; 310/178, 308, 309, 115, 118, 120

[56] References Cited

U.S. PATENT DOCUMENTS

| | | | |
|---|---|---|---|
| 1,677,745 | 10/1925 | Bonetto | 290/55 X |
| 2,097,286 | 10/1937 | McGee | 310/115 |
| 2,159,653 | 10/1936 | Carlin | 170/10 |
| 2,914,688 | 11/1959 | Matthews | 310/178 |
| 3,185,877 | 1/1963 | Sears | 310/178 |
| 3,974,396 | 8/1976 | Schoenball | 416/DIG. 4 |

Primary Examiner—A. D. Pellinen
Assistant Examiner—D. S. Rebsch

[57] ABSTRACT

A wind actuated turbine which causes a magnet-brush spinner and a copper foil covered disc spinner to counter rotate and generate electricity by the Faraday Principle.

3 Claims, 5 Drawing Figures

A-A

WINDSPINNER FARADAY PRINCIPLE ELECTRICITY GENERATOR

BRIEF SUMMARY OF THE INVENTION

This invention is a turbine-like windspinner which has an interior raised edge that is in contact with a roller and drive pulleys and as it spins it causes a magnet-brush spinner and a copper foil covered disc spinner to counter rotate and thereby generate electricity by the Faraday Principle.

Figure 1:
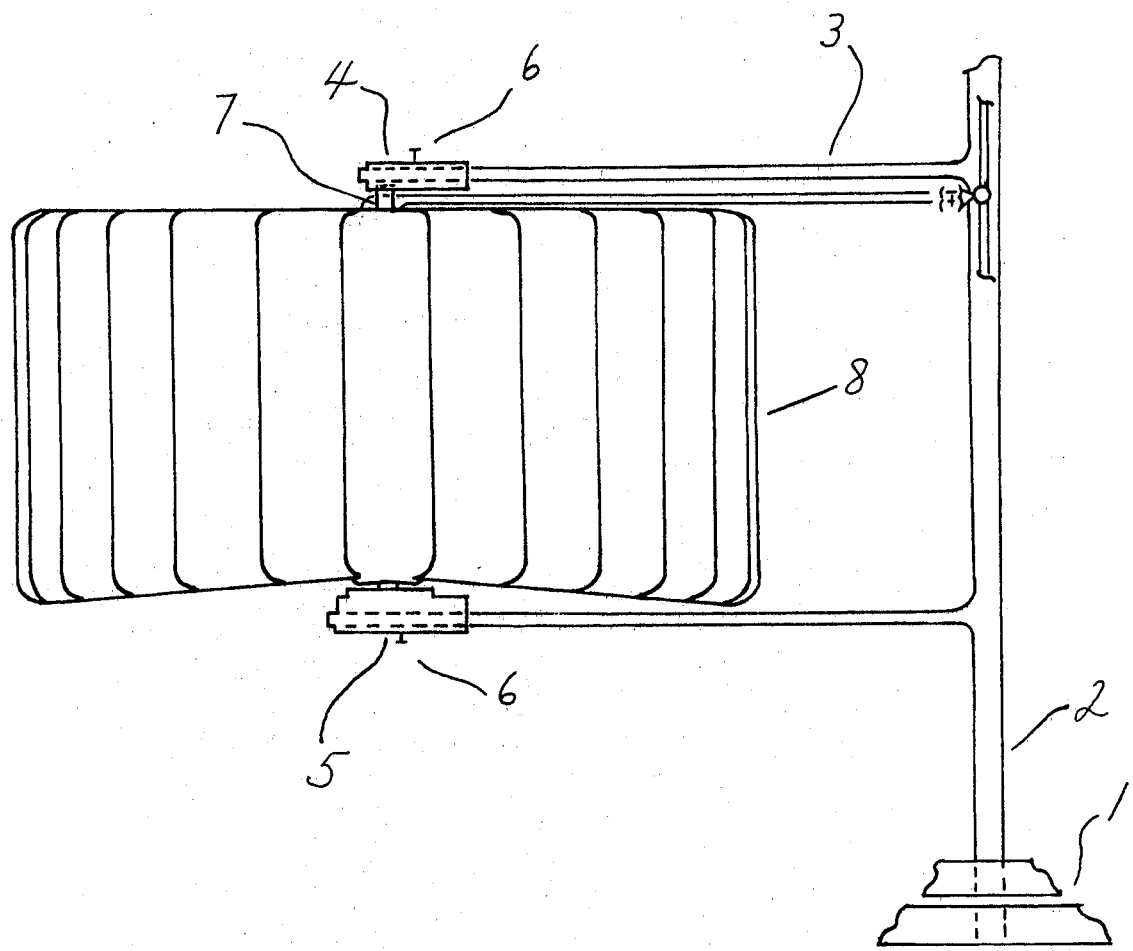
FIG. 1 is a side view of the invention which shows the windspinner as it is supported by a base, a vertical support, and two horizontal supports.

The invention could be made as follows: refer to FIG. 1 and provide a base 1 and a vertical support 2, two horizontal supports 3 permanently fastened by one end to the vertical support 2, with their opposite end a long rectangular shape, a top piece 4, and a bottom piece/bearing 5, each a rectangular frame-like shape, each with a square recess on one side, the rectangular shaped end of the horizontal supports 3 to fit into the outer portion of the frames 4 and 5, and be secured by set screw 6, a generator shaft 7, squared at each end to be fit into the square recess of each end piece 4 and 5, and held in a fixed vertical position by the end pieces 4 and 5 and the horizontal supports 3. The generator shaft 7 could be made of plastic with metal facing or bushings in the area where moving parts are in contact with it.

Provide further, a windspinner 8 shaped like a turbine. It could be constructed by glue laminating and reinforcing pieces of styrofoam or other light weight plastic material that is cast or made with the shape or configuration of 8 shown in FIG. 2.

The interior center surface of the windspinner 8 contains a raised ridge 13 surface that is engaged by the center roller 26 of a spindle roller/pulley 25 system.

The surface of the raised ridge 13 and the surface of the center roller 26 could be coated with rubber or a similar material that will minimize slippage between the two.

Figure 3:
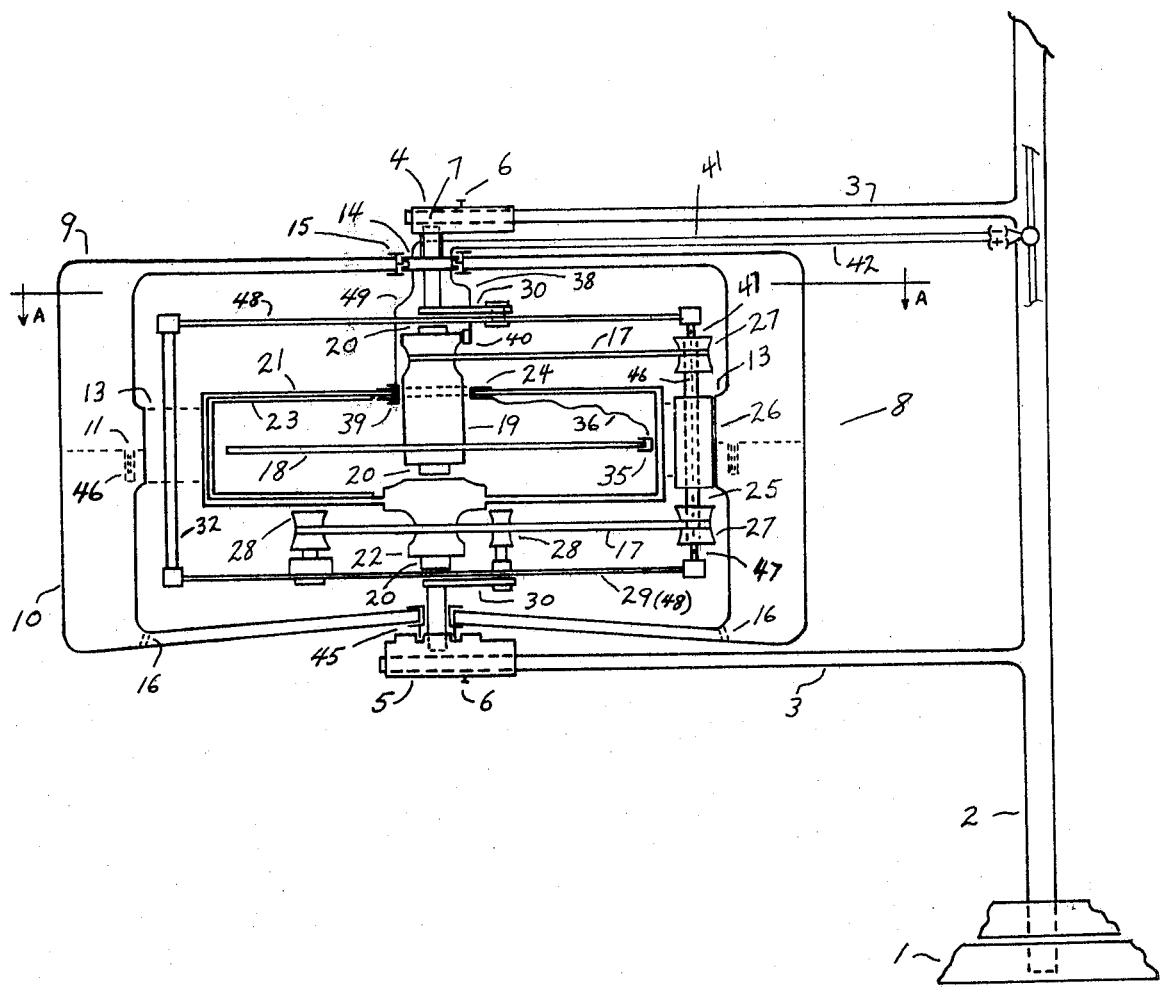
FIG. 3 is a full side view of the invention.

Refer to FIG. 3 and provide further, bearings 45 and 15, made possibly from nylon, steel or brass, the top bearing 15 assembly to consist of a circular bushing 14 with a square cut out in the center so that it will remain in a fixed position when put on a squared portion of the shaft 7, and with a channel-like recess in its circular vertical dimension so it can provide a "riding surface" for the bearing 15 which will be a circular channel collar-like shape and have a horizontal projection out of its vertical dimension, the channel portion of the bearing 15 to receive and be fastened to the top horizontal surface of the windspinner upper half 9, the bottom bearing 45 assembly to consist of a circular channel collar-like shape bearing 45 with a downward projecting vertical skirt-like bushing which seats and rides in a circular channel-like recess in the top surface of the bottom end piece 5.

Figure 5:
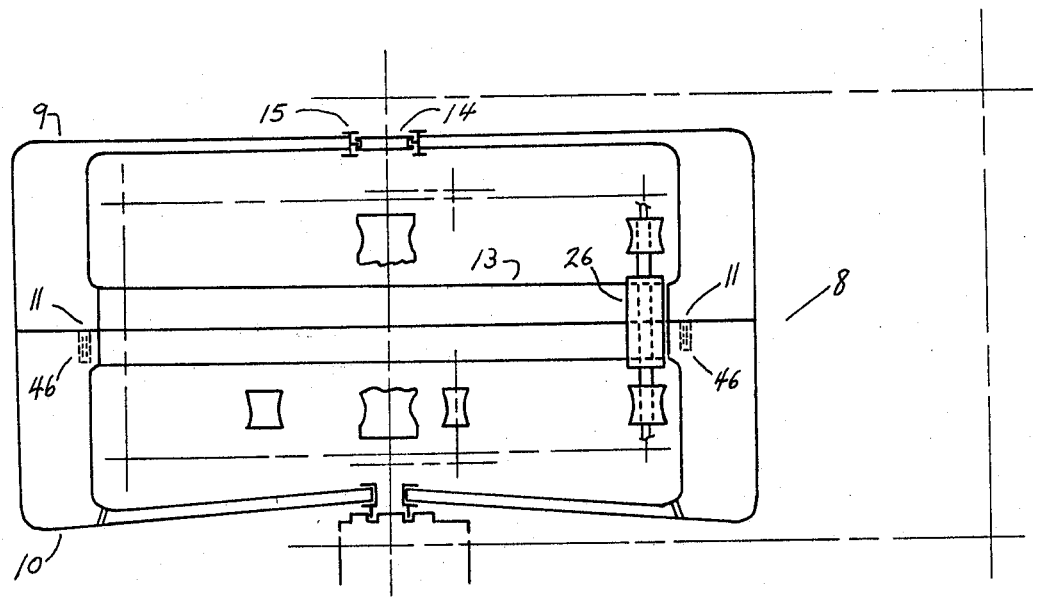
FIG. 5 is an interior view of the windspinner which shows the roller, the interior center surface, and the upper and lower halves of the windspinner with their alignment pins and recessed holes.

Refer to FIG. 5 and note that the windspinner 8 has an upper half 9 with alignment pins 11 projecting downward and a lower half 10 with recessed holes 46 into which the alignment pins 11 fit.

The upper and lower halves of the windspinner 8 are held together by the top circular bushing 14 which is permanently fastened to the generator shaft 7 and the bottom end piece 5, and can be separated to permit access and servicing such as replacing a drive belt 17 or tension spring 33.

Provide vents 16 in the bottom surface of the lower half of the windspinner 10 as a means for rain water to spin out. The bottom surface is near horizontal.

The belts 17 could be made of rubber. They are single strand end overlapped and bonded.

Figure 2:
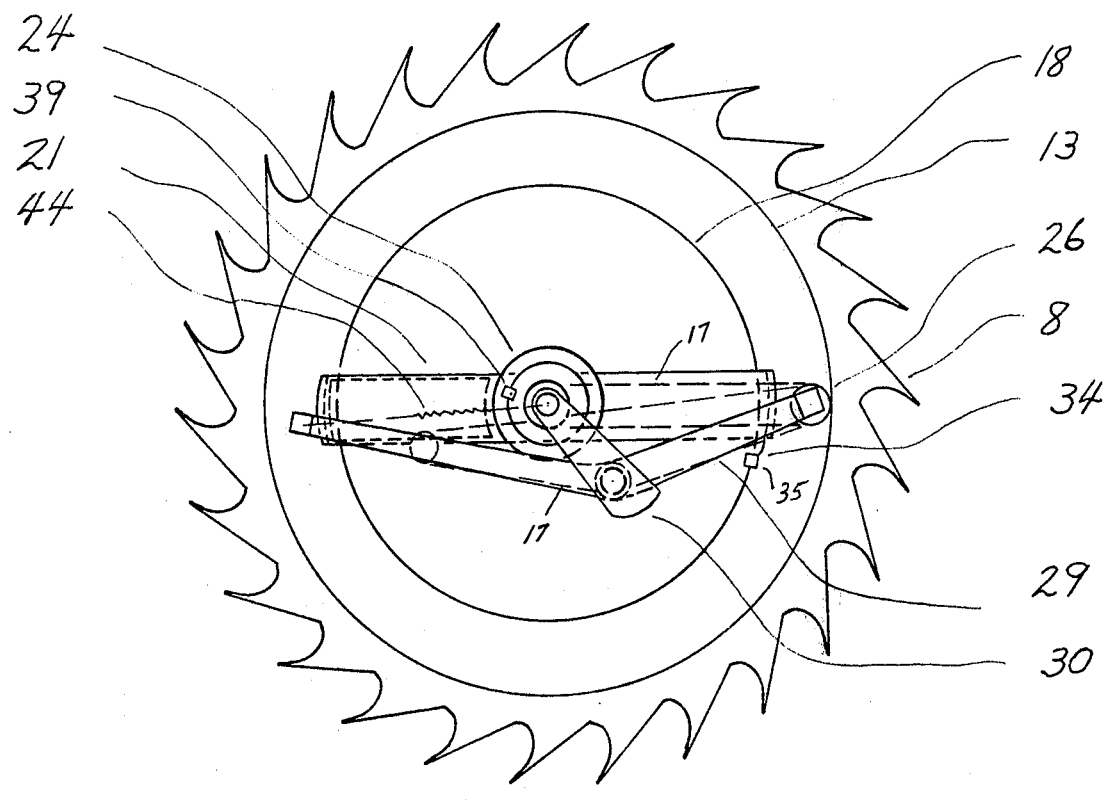
FIG. 2 is a sectional top view of the invention through A—A of FIG. 3, which shows the top profile or shape of the windspinner, the magnet-brush spinner, the disc spinner, the roller in contact with the interior center surface of the windspinner, and the belt drive configurations.

Refer to FIGS. 2 and 3 and provide further, a copper foil covered circular disc 18 spinner with a spindle like elongated hub pulley 19 set on a fixed flanged bushing type bearing 20 and retained at the top by a similar bearing.

The disc 18 could be cut or molded styrofoam or structured from light weight plastic and covered with a copper foil surface.

Provide a magnet-brush 21 spinner by shaping a rectangle with a section of the top long leg removed, and mounting it on a flanged spindle-like pulley 22. A flat piece of plastic material could be used for this. The unit will be contained at top by the bottom surface of the bearing 20 that the disc 18 spins on and it will spin on the same type bearing 20.

Fasten a magnet 23 that is high in energy per unit volume, possibly a Samarium cobalt alloy magnet, either a horseshoe shape or two fixed magnets, within one end of the rectangle of the spinner.

Provide a channel shaped collar-like washer 24 in the center of the top long side of the rectangle.

Figure 4:
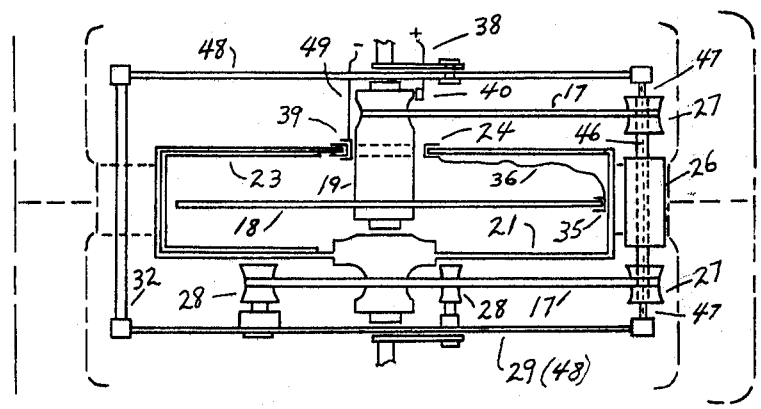
FIG. 4 is a detailed interior view of the windspinner.

Refer to FIG. 4 and provide a system where a roller 26 engages the internal ridge 13 of the windspinner 8 and transmits the torque of the windspinner 8 via drive pulleys 27 and idler pulleys 28 to the disc 18 spinner pulley hub 19 and drives it in a counter clockwise direction and to the magnet-brush 21 spinner flanged pulley 22 and drives it in a clockwise direction.

Provide a rectangular frame 29 for the components of the system. The top and bottom members of the frame 29 are angled. The left vertical member of the frame 29 serves as a stabilizer 32.

Pivot mount the frame 29 with its horizontal members 48 resting on the short horizontal support arms 30.

Mount a roller 26 and two drive pulleys 27 on a spindle 25 and place the spindle 25 on the right vertical member 31 of the frame 29, and contain it between fixed sleeve bushings 48 at top and bottom.

Mount two idler pulleys 28 on the bottom horizontal member 47 of the frame 29 and refer to FIGS. 2 and 4 to note that the disc 18 spinner pulley hub 19 is directly driven by a belt 17 encompassing it and the top drive pulley 27 and that the magnet-brush 21 pulley 22 is indirectly driven by a belt 17 that encompasses the bottom drive pulley 27 and the two idler pulleys 28 and is in peripheral contact with it (pulley 22).

The rectangular frame 29 is movable, but a light pressure contact is maintained between the center roller 26 and the interior center surface 13 of the windspinner 8 by tension spring 33.

Electricity is taken off from this Faraday Principle windspinner generator by means of a brush and collar system.

Refer to FIGS. 2,3,& 4 and provide a primary negative side brush 35 in the form of a flexible forked arm 34 with a leaf like brush 35 fastened to each tine of the fork. Fasten the non-forked end of the arm 34 to the vertical member of the magnet-brush 21 rectangle opposite the magnet 23 so that the disc 18 spinner is engaged by and passes through the trailing edges of the leaves of the brush 35 as it spins.

Provide further, a contact wire 36 which extends from the primary brush arm 34 to the channel collar washer 24, and provide a secondary negative side brush 39, similar in construction to the primary brush 35, fastened to an arm 49 which is supported by and passes through the top bushing 14. The leaves of the secondary brush 39 engage and sweep the collar washer 24 and current is conducted through a contact wire 41 that is fastened to the end of the brush arm 49 to a point of takeoff on the vertical support 2.

Provide a (single) leaf like positive side brush 40 that is fastened to a flexible arm 38 and that engages and sweeps the vertical surface of the top of the disc spinner hub pulley 19. The arm 38 passes through and is supported by top bushing 14. Current is conducted through a contact wire 42 that is fastened to the end of the brush arm 38 to a point of take-off on the vertical support 2.

APPLICATION AND USE OF THE INVENTION

The invention was conceived as a means of utilizing the wind (even a breeze) when it is at low, possibly less than 10, miles per hour to generate a direct current.

The inventor observed the movement of leaves on trees and reasoned that several lightly constructed windspinners might yield an appreciable current. In seeking simplicity the invention was conceived as being directly wired to a miniature element that would become heated as the current was generated. Several windspinners it was felt could conceivably be an excellent complement/supplement to a conventional Solar heating unit.

I claim as my invention:

1. A wind actuated electric power generation apparatus comprising wind actuated propulsion means including an outer surface with radially disposed vanes, an inner surface including means for transmitting fluid motion to an electrical generation apparatus, end surfaces including centrally located bearings allowing rotation of said propulsion means, a shaft passing through said bearings, transmission means disposed in an enclosure formed by said inner surface and said end surfaces, and transmission receiving input motion from said inner surface transmitting means and outputting two rotation motions of opposite sense, and an electric generator receiving said opposite sensed motions, the improvement comprising structuring the generator as a Faraday Principle electric generator consisting essentially of an inner rotating mass containing metallic copper and an oppositely rotating outer mass at least partially enclosing an inner rotating mass and comprising a permanent magnet.

2. The improved power generator of claim 1 wherein the transmission means comprises a cooperative assembly of pulleys and belts for transmitting said fluid motion to said electric generator.

3. The improved power generator of claim 2 wherein the generator is provided with a brush in electric conduction with the metallic copper of said inner rotating mass and in contact with the pulley which drives it and a brush in electric conduction with said metallic copper and mounted for support on said outer rotating magnet.

* * * * *